Nov. 15, 1955 A. F. BOSCIA 2,724,050
PULSE SEPARATION CIRCUIT
Filed April 23, 1952
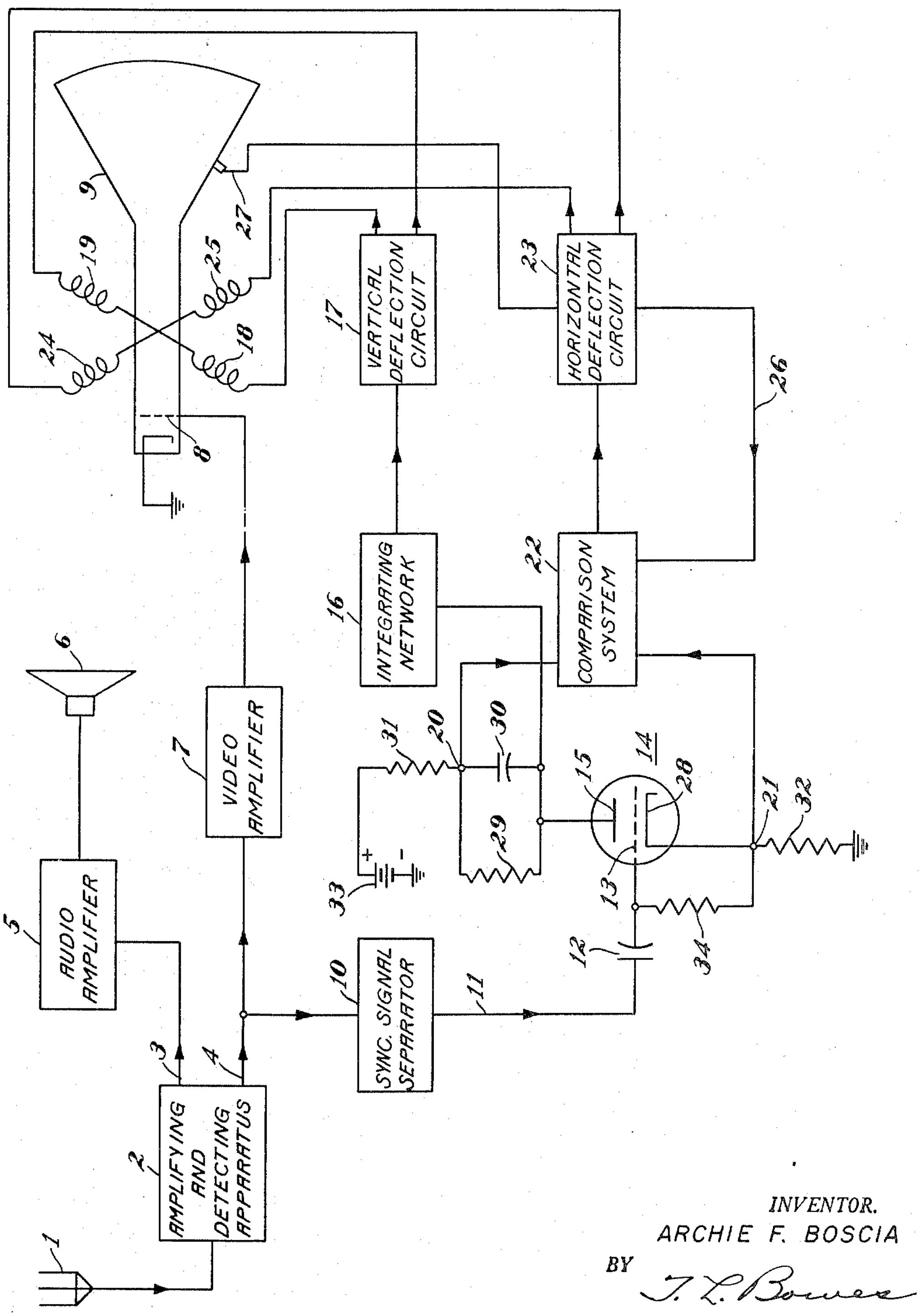
INVENTOR.
ARCHIE F. BOSCIA
BY T. L. Bowes
ATTORNEY United States Patent Office 2,724,050
Patented Nov. 15, 1955

2,724,050

PULSE SEPARATION CIRCUIT

Archie F. Boscia, Rochester, N. Y., assignor, by mesne assignments, to General Dynamics Corporation, a corporation of Delaware Application April 23, 1952, Serial No. 283,937

4 Claims. (Cl. 250—27)

My invention relates to pulse circuits and more particularly to circuits for separating pulses of various durations.

My invention finds particular application in television receivers where the composite synchronizing waveform must be broken down into a train of vertical pulses and a train of horizontal pulses. The horizontal pulse output is frequently derived in push-pull form from the separation circuit so that it may be used in a blocking oscillator "comparison system" for maintaining constant the frequency of the horizontal deflection circuit. The operation of comparison systems is explained in the January 1951 issue of Radio & Television News, on page 71. In pulse separation circuits, it is important that the vertical pulse output be as large as possible.

It is accordingly an object of my invention to provide a pulse circuit which not only begins the process of pulse separation but also amplifies the vertical pulse train.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing which shows, in schematic form, one embodiment of my invention as applied to a television receiver.

Referring now to the drawing, I have shown the major sections of a television receiver in block diagram form because their nature is well understood by those skilled in the art. Thus a signal collecting antenna 1 is shown connected to an amplifying and detecting apparatus 2 which furnishes audio and video signals at its output lines 3 and 4, respectively. The audio signal is amplified in audio amplifier 5 and fed to a loudspeaker 6. The video signal is amplified in video amplifier 7 and fed to the grid 8 of a cathode ray picture tube 9. A video signal from apparatus 2 may also be fed to a sync signal separator 10, which strips off the picture information and leaves the synchronizing pulse information. The latter information, appearing on lead 11, is coupled through capacitor 12 to a control element, or grid, 13 of an electron discharge device, or tube, 14. The output appearing at anode, or plate, 15 of device 14 is fed through an integrating network 16 to the vertical deflection circuit 17. This deflection circuit in turn drives the vertical windings 18 and 19 of the deflection yoke, thus causing the beam of the cathode ray picture tube to be displaced vertically in accordance with present television standards.

Horizontal synchronizing signals of opposite polarity are derived at points 20 and 21 in the circuit of tube 14. As explained in the earlier-identified magazine reference, these signals furnish a control voltage to the comparison system 22, which in turn controls horizontal deflection circuit 23. The horizontal deflection circuit in turn drives the horizontal windings 24 and 25 of the deflection yoke, thereby deflecting the picture tube beam in standard fashion. An error voltage is fed back from deflection circuit 23 over path 26 to the comparison system 22. Deflection circuit 23 may be of the fly-back type, in which case it may furnish high voltage as indicated by line 27 for the second anode of picture tube 9. It will be understood by those skilled in the art that the circuits enclosed in the various blocks of the accompanying drawing may be furnished with power from a common source or separate sources or a combination thereof.

Turning now to a detailed consideration of the exampled embodiment of my invention, it may be seen that the discharge device or tube 14 has a cathode 28 in addition to control element, or grid, 13 and an anode, or plate, 15. The load circuit for tube 14 may have three portions: a first portion including resistor 29 paralleled by capacitor 30, a second portion comprising resistor 31, and a third portion comprising resistor 32. These three portions may be seen to be effectively connected in series with a source of unidirectional potential, such as a battery 33, between plate 15 and cathode 28 of tube 14. The input voltage is impressed across grid resistor 34 which is connected between grid 13 and cathode 28. This input voltage has a waveform containing low- and high-frequency components, which I intend relative to the present embodiment to refer to as the horizontal and vertical pulses, respectively.

In accordance with my invention, I proportion capacitor 30 such that it presents appreciable impedance to the low-frequency component of the input waveform, i. e., the vertical synchronizing pulses. However, I proportion capacitor 30 such that its impedance at the horizontal pulse frequency is relatively low. Thus, the combination of resistor 29 and capacitor 30 provides an appreciable degree of integrating action relative to the low-frequency components, but is substantially free of such integrating tendencies relative to said high-frequency components.

Further in accordance with my invention, I prefer that resistors 31 and 32 be of substantially equal value. By reason of the low impedance to horizontal pulses of capacitor 30, the second and third sections of the tube load (resistors 31 and 32) develop trains of horizontal pulses having equal voltage but opposite polarity. These are the voltages which are developed at points 20 and 21 and which are used to drive comparison system 22.

Through the use of capacitor 30, I am enabled, according to my invention, to offer an appreciably greater plate load to the low-frequency components of the input waveform. Stated another way, at the vertical pulse frequency, the plate circuit of tube 14 includes the parallel combination of resistor 29 and capacitor 30 in series with resistor 31. Since this plate load is greater than the load offered by the second portion (resistor 31 alone) of the total load circuit, the voltage developed at plate 15 is considerably greater than would have been obtained if resistor 29 and capacitor 30 had been omitted. As far as I am aware, it has never been known to include both units 29 and 30 as I show in the accompanying drawing. The addition of capacitor 30 results in a higher ratio of vertical to horizontal pulses, since resistor 31 is preferably made equal to resistor 32 to provide amplitude-balanced input voltages to comparison system 22. Resistor 29 may thus be increased in value to achieve a larger vertical amplitude without a corresponding decrease in horizontal amplitude. The effects of random noise are minimized, and the amount of horizontal pulse voltage retained in the vertical pulse waveform is diminished.

The following values of components have been found to produce satisfactory operation of this embodiment of my invention:

| | |
|---|---|
| Resistor 32 | 2,000 ohms. |
| Resistor 29 | 10,000 ohms. |
| Resistor 31 | 2,000 ohms. |
| Capacitor 30 | 0.005 microfarads. |
| Tube 14 | ½ type 6SN7GT. |

For these values, the voltage supplied by source 33 should preferably be approximately 160 volts.

While I have shown and described my invention as applied to a specific embodiment thereof, other modifications will readily occur to those skilled in the art. For example, it can be seen that a single-ended output voltage for the high-frequency components of the input waveform may be derived if the cathode load is omitted or if the cathode resistor is by-passed. I do not, therefore, desire my invention to be limited to the specific arrangement shown and described, and I intend in the appended claims to cover all modifications within the spirit and scope of my invention.

What I claim is:

1. In a pulse circuit, the combination of a source of voltage having a waveform containing low- and high-frequency components; an electron discharge device having at least an anode, a cathode, and a control electrode; said source of voltage being coupled to said electron discharge device between said cathode and said control electrode; a source of unidirectional potential having positive and negative terminals; a load circuit for said electron discharge device comprising a first, a second and a third section, said first and second sections being connected in series from said anode to said positive terminal, and said third section being connected between said cathode and said negative terminal; said first circuit having a tendency to integrate said low-frequency components only; means for deriving said low-frequency components in amplified form from across the series combination of said first and second sections; means for deriving said high-frequency components of one polarity from across said second section; and means for deriving said high-frequency components of the opposite polarity across said third section.

2. The combination of claim 1 in which said first section comprises resistive means modified by reactive means and said other sections comprise substantially resistive means.

3. The combination of claim 2 in which said first section comprises resistance means paralleled by capacitive reactance means, and said second and third sections comprise resistance means of substantially equal value.

4. The combination of claim 1 in which said second and third sections have substantially equal impedance values.

References Cited in the file of this patent

UNITED STATES PATENTS

| | | |
|---|---|---|
| 2,176,663 | Browne et al. | Oct. 17, 1939 |
| 2,181,572 | Bowman-Manifold et al. | Nov. 28, 1939 |
| 2,207,775 | Bedford | July 16, 1940 |
| 2,421,138 | Wheeler | May 27, 1947 |
| 2,508,923 | Mautner | May 23, 1950 |

FOREIGN PATENTS

| | | |
|---|---|---|
| 109,937 | Australia | Feb. 27, 1940 |